Oct. 24, 1967   C. R. PATTERSON   3,348,688
MANUAL FILTER FOR A WASHING MACHINE
Filed Sept. 8, 1964   3 Sheets-Sheet 1
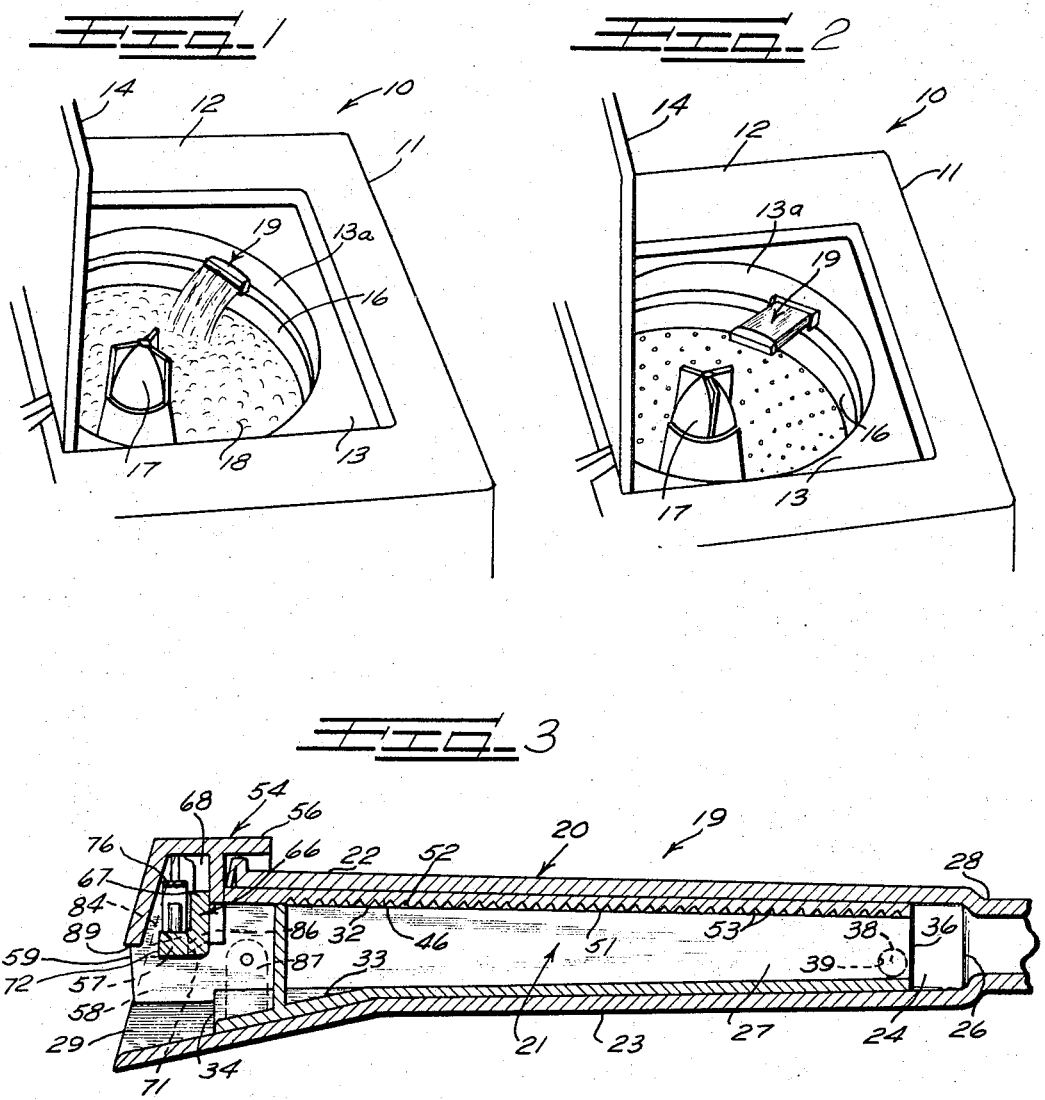
INVENTOR.
Carl R. Patterson

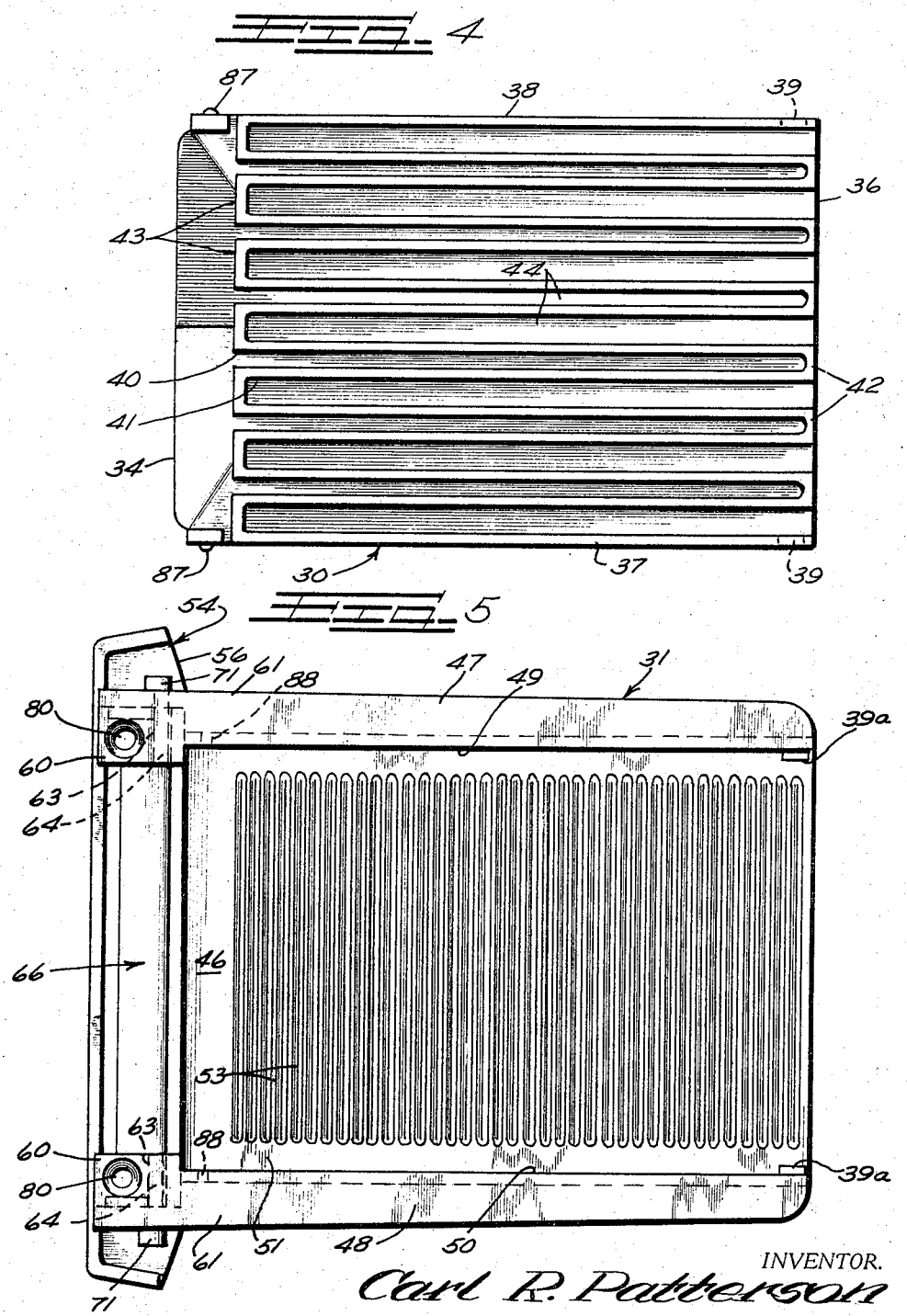

Oct. 24, 1967
C. R. PATTERSON
3,348,688
MANUAL FILTER FOR A WASHING MACHINE
Filed Sept. 8, 1964
3 Sheets-Sheet 3
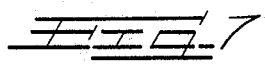
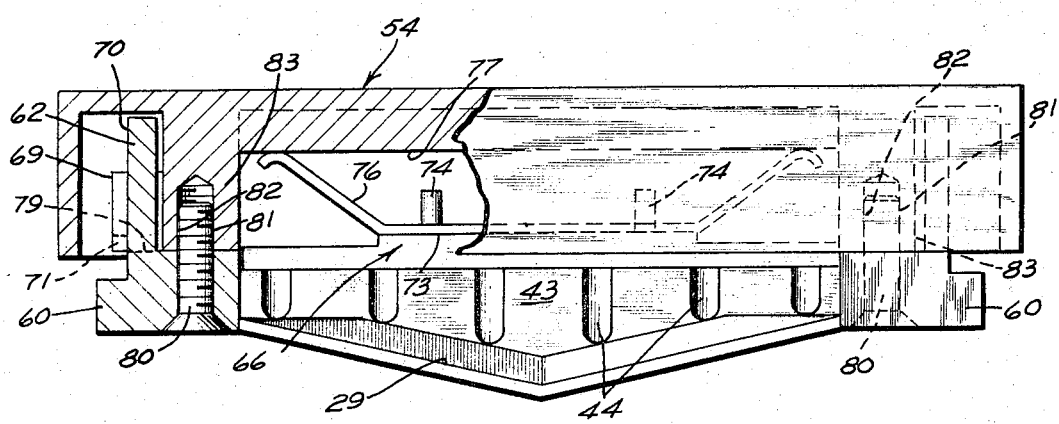
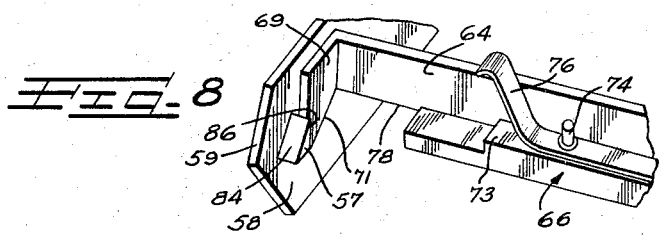
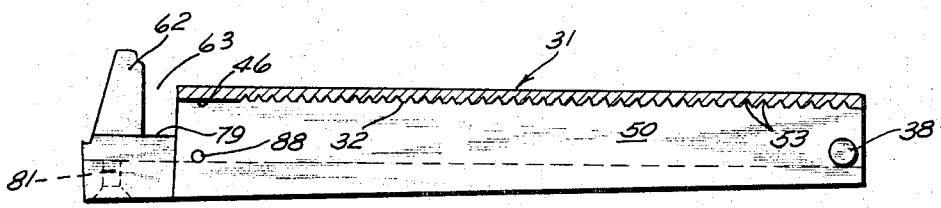
INVENTOR.
Carl R. Patterson United States Patent Office 3,348,688
Patented Oct. 24, 1967

3,348,688
MANUAL FILTER FOR A WASHING MACHINE
Carl R. Patterson, St. Joseph, Mich., assignor to Whirlpool Corporation, Benton Harbor, Mich., a corporation of Delaware
Filed Sept. 8, 1964, Ser. No. 394,726
3 Claims. (Cl. 210—238)

ABSTRACT OF THE DISCLOSURE

A fluid filter for a laundry appliance comprising a filter cartridge removably insertable into a housing. The housing is connected in series with the hydraulic circuitry of the appliance. With the filter cartridge inserted into the housing, laundry liquid is forced to pass through a filter maze formed in the cartridge which serves to remove lint and other foreign particles entrained in the liquid. The filter cartridge may be easily removed from the housing and flushed clean under a water faucet.

---

This invention relates generally to filters and more particularly relates to a manually cleanable fluid filter suitable for use in a cleaning or laundry device such as a washing machine for removing lint and other foreign particles from the laundry liquid or cleaning fluid.

Briefly, the filter of the present invention comprises a housing having a fluid inlet and a fluid outlet for connection into the hydraulic circuitry of the laundry device, and a filter cartridge removably insertable into the housing. The filter housing and cartridge are constructed such that the laundry liquid or cleaning fluid which is circulated through the filter must pass through a filter maze formed in the cartridge, which maze serves to remove lint and other foreign particles entrained in the fluid.

The cartridge comprises a cartridge body and a cover member hingedly connected to the body. The cover member is pivotally movable to a closed position with respect to the body wherein engaging irregular surfaces of the body and the cover member form the filter maze and wherein the filter is insertable in the housing, and movable to an open position, wherein the irregular surfaces which form the filter maze can be easily cleaned by flushing under a water faucet.

The filter of the present invention features an easily actuatable latch mechanism for releasably locking the cartridge in the housing. In addition, the filter is simple in design, inexpensive in manufacture and has a long useful operating life.

It is, therefore, an object of the present invention to provide a simple yet effective filter suitable for use in cleaning or laundry devices such as washing machines for removing lint and other foreign particles entrained in the laundry liquid.

Another object of the present invention is to provide a filter comprising a housing and the filter cartridge insertable into the housing wherein the foreign particles removed by the filter are trapped in the cartridge, the cartridge is removable from the housing for cleaning purposes and wherein the removed cartridge can be quickly and easily cleaned by merely rinsing or flushing it under a water faucet.

Still another object of the present invention is to provide a fluid filter incorporating a filter maze for removing foreign particles from the fluid, and in which such filter maze can be easily cleaned manually to enable the filter to be used repeatedly over a long period of time.

A further object of the present invention is to provide a filter which is simple in design, inexpensive in manufacture and which has a long, useful operating life.

Many other features, advantages ad additional objects of the present invention will become manifest to those versed in the art upon making reference to the detailed description which follows and the accompanying sheets of drawings in which preferred structural embodiments incorporating the principles of the present invention are shown by way of illustrative example only.

In the drawings:
FIGURE 1 is a fragmentary perspective view of a washing machine incorporating the filter of the present invention;
FIGURE 2 is similar to FIGURE 1 but illustrates the filter cartridge being removed from the filter housing;
FIGURE 3 is a fragmentary sectional side view of a filter constructed in accordance with the principles of the present invention;
FIGURE 4 is a top plan view of a cartridge body of the filter of FIGURE 3;
FIGURE 5 is a bottom plan view of a cover member of the filter cartridge;
FIGURE 6 is a fragmentary sectional side view of a cover member of the filter cartridge;
FIGURE 7 is a front elevational view of the filter cartridge of the invention with a handle mounted thereon and with portions thereof shown in section for clarity; and
FIGURE 8 is a fragmentary perspective view showing the mechanism used to lock the filter cartridge into the filter housing.

As shown in the drawings:
Although the principles of the present invention are of utility in any fluid-filtering application, a particularly useful application is made to cleaning and laundry devices of the home appliance type and an illustrative embodiment is exemplified by an automatic washing machine of the so-called vertical axis type.

Referring to FIGURES 1 and 2 of the drawings, an automatic washing machine incorporating the principles of the present invention is shown generally at reference numeral 10 and comprises generally a cabinet 11 having a top wall 12 recessed as at 13 to accommodate a top closure door 14.

A tub 16 is mounted within the cabinet to provide a washing or treatment zone for confining a load of fabric or other material to be washed or cleaned therein. A vertically extending agitator 17 is situated in the tub for providing a cleaning action to the material confined within the tub.

Also confined within the tub 16 is a quantity of laundry liquid indicated generally at 18 which is agitated along with the material confined within the tub to remove dirt, grit and other foreign particles from the material.

The machine 10 is provided with suitable hydraulic circuitry including a fluid pump for circulating the laundry liquid 18 during a washing cycle from the tub 16 through the hydraulic circuitry, which includes a laundry liquid filter and then back into the tub.

In accordance with the principles of the present invention, a laundry liquid filter 19 is mounted in the cabinet 11. An outlet end of the filter extends through a downturned wall 13a of the cabinet 11 to discharge laundry liquid circulated therethrough back into the tub 16.

Referring to FIGURES 3–5, the filter 19 more particularly comprises a housing or casing 20 and a complemental filter cartridge 21 removably insertable into the housing 20.

The housing 20 is in the general shape of a rectangular parallelepiped and comprises a pair of spaced substantially parallel top and bottom walls 22 and 23, spaced substantially parallel side walls as at 24 and a back wall 26 extending transversely to the top and bottom walls and to the side walls to form a chamber 27. A fluid inlet 28 is formed in the back wall 26 for supplying fluid into the interior or chamber 27 of the housing 20 and is adapted for connection into the hydraulic circuitry of the washing machine 10. A front portion or outlet 29 of the housing is open to receive the filter cartridge 21 and to discharge the fluid circulated through the filter back into the treatment zone or tub of the washing machine.

As noted, the filter cartridge 21 comprises a rectangularly shaped cartridge body 30 and a cover member 31. The cartridge body 30 comprises a top surface 32 and bottom wall 33, which conform to the top and bottom walls 22 and 23 of the housing 20, front and back walls 34 and 36, which extend in parallel relation to the back wall 26 of the housing 20 and spaced parallel side walls 37 and 38 which extend in parallel relation to the side walls 24, 24 of the housing 20.

The member 30 is connected for pivotal movement to the cartridge body 31 by means of complemental hinge members 39 and 39a situated in engaging relation on the cartridge body 30 and the cover member 31, respectively, adjacent the back wall 36 of the cartridge body.

Extending outwardly from the bottom wall 33 of the cartridge body 30 are a plurality of elongated wall members, as for example at 40 and 41, which extend in spaced parallel relation with respect to one another substantially the entire length of the cartridge body 30, that is, substantially between front and back walls 34 and 36, and also extend transversely to the top and bottom walls 22 and 23 of the housing 20 when the cartridge is inserted into the housing as shown in FIGURE 3.

Each pair of adjacent wall members 40 and 41 provides an elongated fluid flow path within the chamber 27 of the housing 20 from the back wall 36 of the cartridge 21 substantially to the front wall 34 thereof. In addition, alternate pairs of adjacent wall members 40 and 41 are interconnected at the back wall 36 by means of a plurality of transverse walls as at 42 and near the front wall 34 by means of transverse walls 43.

It will be noted that the wall members 40 and 41 and the transverse walls 42 and 43 serve to form a plurality of elongated flow paths as at 44 which extend in the direction of the central axis of the housing 20 from the back wall 36 of the filter cartridge 21 substantially to the front wall 34 thereof, and which extend across the housing 20 in a direction transverse to the central axis thereof between the side walls 24, 24. Approximately half of the flow paths 44 are in fluid communication with the inlet 28 of the housing 20, but are not in fluid communication with the open end 29, thereof, and the remaining group of flow paths 44, which are situated respectively between pairs of flow paths of the first group, are not in fluid communication with the inlet 28 but are in fluid communication with the open end 29 of the housing 20.

In the assembled condition of the filter 19, as viewed in FIGURE 3, wherein the filter cartridge 21 is shown inserted into the housing 20, a top wall 46 of the cover member 31 overlies the cartridge body 40 and a pair of guide flanges 47 and 48, which depend downwardly from the top wall 46, comprise respectively, inner walls 49 and 50 which overlie the end walls 37 and 38 of the cartridge body 30.

In the closed or assembled position of the cover member 31 with respect to the cartridge body 30, an inner surface 51 of the cover member top wall 46 is engaged in abutting relation with an outer extremity or distal end surface 52 of each of the elongated wall members 40 and 41.

In order to provide fluid communication between the inlet 28 and the outlet 29 of the housing 20, and in order to trap and to remove lint, dirt, grit and other foreign particles entrained in the laundry liquid as it is circulated through the filter 19, the inner surface 51 of the top cover wall 46 has formed therein a plurality of fine grooves as at 53 which extend transversely to the longitudinal dimension of the wall members 40 and 41. The grooves 53 provide fluid communication between adjacent flow paths 44 thereby enabling laundry liquid which enters the housing 20 through the inlet 28 to enter that group of flow paths 44 in fluid communication with the inlet 28, then to "cross over" into adjacent flow paths which are in communication with the outlet 29 to be discharged from the housing 20. It will be appreciated that the grooves 53 are dimensioned sufficiently small such as to trap foreign particles entrained in the laundry liquid as the laundry liquid passes through the grooves.

The filter cartridge 21 is slidably insertable into the housing 20 through the open end 29 thereof, and in order to facilitate insertion and removal of the cartridge from the housing a handle 54 is mounted on the cover member 31 and comprises a top wall 56 which is arcuately shaped to overlie a portion of the top wall 22 of the housing 20.

In order to releasably lock the filter cartridge 21 in the housing 20, the handle 54 has incorporated therein a locking mechanism cooperable with a pair of locking nibs formed on the housing 20, and referring to FIGURE 3 and FIGURE 8 it will be noted that a locking nib 57 is formed on an inner face 58 of each of a pair of projections 59 formed respectively on the side walls 24, 24 of the housing 20 and extending beyond the open end 29 thereof.

Referring to FIGURES 3 and 5–8, a pair of mounting brackets 60, 60 are formed at an end portion 61, 61 of the guide flanges 47 and 48 and comprise, respectively, a mounting wall 62 having a groove 63 formed therein in order to afford reciprocal movement within the mounting brackets 60, 60, to a pair of complementarily shaped neck portions 64, 64 of a latch and release bar 66.

The release bar 66 extends substantially across the width of the handle 54 and, as is best illustrated in FIGURE 3, assumes a generally L shaped configuration in cross-section. One leg 67 of the bar 66 is confined for reciprocal movement within the grooves 63, 63 of the mounting brackets 60, 60 and within an aligned groove 68 formed in the handle 54. A pair of flanges 69, 69 are formed at both ends of the bar 66 to overlie an outer face 70 of the corresponding mounting walls 62, 62, and each of the flanges 69, 69 has formed thereon a locking nib 71 shaped complementarily to and cooperable with the locking nibs 57, 57 to engage therewith in locking relation.

Another leg 72 of the latch and release bar 66 comprises a platform 73 having a pair of retaining studs 74, 74 formed thereon to mount a biasing spring 76.

The spring 76 is confined between a shoulder surface 77 formed interiorly of the handle 54 and serves to constantly bias the release bar 66 away from the shoulder 77 such that a bottom surface 78 of the release bar 66 abuttingly engages a bottom wall 79 of the groove 63.

In order to maintain the mounting brackets 60, 60, the handle 54, the release bar 66 and the spring 76 in fixed assembly, a pair of suitable fasteners such as threaded bolts 80, 80 are inserted into a pair of bores 81, 81 formed in the mounting brackets 60, 60 to be received in a pair of complementarily threaded bores 82, 82 formed in a pair of ribs 83, 83 of the handle 54.

Referring to FIGURE 8, it will be appreciated that when assembled filter cartridge 21 is inserted into the housing 20, the locking nibs 71, 71 formed on the release bar 66 are biased by the spring 76 to engage and to slide along a ramp defined by an inclined wall 84 formed on each of the nibs 57, 57 and then to drop behind a back wall 86 of each of the locking nibs 57 to maintain the cartridge 21 and the housing 20 in fixed assembly.

Referring to FIGURE 2, it will be appreciated from the illustration that the housing 20 is mounted within the cabinet 11 and that the filter cartridge 21 can be easily removed from the outlet 29 of the housing 20 for cleaning purposes. Foreign particles entrained in the laundry liquid which have been trapped and accumulated in the filter cartridge 21 can be quickly and easily removed from the cartridge by merely pivoting the cover member 31 on the hinges 39, 39 away from the cartridge body 30 and then flushing the cartridge body 30 and the cover member 31 under a water faucet.

After the filter cartridge 21 has thus been cleaned, the cover member 31 can again be closed over the cartridge body 30 and it will be noted that a pair of embossments 87, 87 formed on the cartridge body are received in a pair of complemental recesses 88, 88 in order to form a "snap-fit" connection for maintaining the cartridge body 30 and the cover member 31 in a closed position.

Referring again to FIGURE 3, in order to remove the cartridge 21 from the housing 20 it is merely necessary to apply a slight upward force against the leg 72 of the release bar 66, which leg 72 protrudes downwardly below a front wall 89 of the handle 54. Such upward movement of the release bar will thus disengage the locking nibs 71, 71 thereof from the locking nibs 57, 57 formed on the housing 20 whereupon the filter cartridge 21 can be removed from the outlet 29 of the housing 20.

In summarization of the operation of the filtering device, the fluid to be filtered enters through the inlet 28 and flows into the flow paths 44 which are in fluid communication with the inlet 28. The fluid "crosses over" through the filtering surfaces formed by grooves 53 into the adjacent flow paths 44 which are in fluid communication with the outlet 29. The foreign particles to be removed from the fluid are collected at the grooves 53. To clean the filter, the operator removes the filter cartridge 21 from the housing 20 as previously described and transports the filter cartridge to the place of disposal for the filtrate material. The filter cartridge is then opened by pivoting the cover member 31 away from the cartridge body 30 thus giving open access to the filtering surface lending itself to extreme ease in cleaning.

Although minor modifications might be suggested by those versed in the art, it should be understood that I wish to embody within the scope of the patent warranted hereon all such modifications as reasonably come within the scope of my contribution to the art.

The embodiments of the invention in which an exclusive property or privilege is claimed are defined as follows:

1. A laundry liquid filter for use in a washing machine to remove foreign particles from the laundry liquid comprising, an elongated housing having a liquid inlet and a liquid outlet situated respectively at opposite ends of said housing and a chamber communicating said inlet and said outlet, a filter cartridge including a cartridge body and a cover member, a plurality of spaced parallel imperforate rigid wall members formed on said cartridge body and extending outwardly therefrom to form a plurality of flow paths therebetween communicating said inlet and said outlet and extending substantially parallel to the longitudinal axis of said housing, a plurality of axially transverse imperforate rigid walls extending between adjacent wall members at the ends thereof and arranged to block a first group of said flow paths from said inlet and to block a second group of said flow paths from said outlet, said flow paths of said first group being arranged, respectively, between pairs of flow paths of said second group, and hinged members formed on said cover member and on said cartridge body to pivotally guide said cover member to a closed position wherein said cover member overlies said cartridge body and to an open position wherein said cover member is pivoted away from said cartridge body, said hinge means being constructed and arranged on the body and cover member so as not to restrict substantially, completely open longitudinal flow from the inlet through the cartridge to the outlet, said cover member having an inflexible filter surface formed thereon and engageable with the outer extremities of said wall members in the closed position of said cover member and having a plurality of grooves formed therein and extending transversely to said wall members to communicate adjacent flow paths in the closed position of said cover member, said filter cartridge being insertable into said housing through said outlet in the closed position thereof for communicating liquid from said inlet to said outlet and for removing particles entrained in the liquid in said grooves, and said filter cartridge being removable from said housing whereby said cover member can be pivoted to said open position for flushing said wall members, said flow paths and said filter surfaces under a water faucet.

2. A laundry liquid filter for use in a washing machine to remove foreign particles from the laundry liquid comprising, an elongated housing having a liquid inlet and a liquid outlet situated respectively at opposite ends of said housing and a chamber communicating said inlet and said outlet, a filter cartridge including a cartridge body and a cover member, a plurality of spaced parallel imperforate rigid wall members formed on said cartridge body and extending outwardly therefrom to form a plurality of flow paths therebetween communicating said inlet and said outlet and extending substantially parallel to the longitudinal axis of said housing, a plurality of axially transverse imperforate rigid walls extending between adjacent wall members at the ends thereof and arranged to block a first group of said flow paths from said inlet and to block a second group of said flow paths from said outlet, said flow paths of said first group being arranged, respectively, between pairs of flow paths of said second group, hinged members formed on said cover member and on said cartridge body to pivotally guide said cover member to a closed position wherein said cover member overlies said cartridge body and to an open position wherein said cover member is pivoted away from said cartridge body, said hinge means being constructed and arranged on the body and cover member so as not to restrict substantially, completely open longitudinal flow from the inlet through the cartridge to the outlet, said cover member having an inflexible filter surface formed thereon and engageable with the outer extremities of said wall members in the closed position of said cover member and having a plurality of grooves formed therein and extending transversely to said wall members to communicate adjacent flow paths in the closed position of said cover member, said filter cartridge being insertable into said housing through said outlet in the closed position thereof for communicating liquid from said inlet to said outlet and for removing particles entrained in the liquid in said grooves, said filter cartridge being removable from said housing whereby said cover member can be pivoted to said open position for flushing said wall members, said flow paths and said filter surfaces under a water faucet, a handle mounted on said filter cartridge to be disposed outside of said housing in the inserted position of said cartridge, a movable latch and release bar mounted on said handle having a nib formed thereon shaped complementarily to and engageable with a nib formed on said housing, and spring biasing means mounted on said handle engageable with said latch and release bar to bias said nibs together in locking engagement to releasably lock said cartridge in said housing.

3. A liquid filter comprising, a housing having a liquid inlet and a liquid outlet and defining a liquid transfer chamber of generally rectangular parallelepiped shape communicating said inlet and said outlet, a filter cartridge removably insertable into said chamber and including a body and a cover member, said body having a first end positionable adjacent said inlet and a second end positionable adjacent said outlet and further having a plurality of longitudinal imperforate rigid wall members formed thereon and forming therebetween longitudinal flow paths between said inlet and said outlet when said body is positioned within said housing, and flow restricting means comprising a plurality of imperforate rigid transverse wall portions connected alternately at said first and said second ends of said filter cartridge so that said longitudinal wall members and said transverse wall members define interdigitated, parallel flow passageways communicating respectively with said inlet and said outlet, said cover member and said body having interlocking hinge means formed thereon to pivotally guide said cover member to a closed position wherein said cover member overlies said body and to an open position wherein said cover member is pivoted away from said body, said hinge means being constructed and arranged on the body and cover member so as not to restrict substantially, completely open longitudinal flow from the inlet through the cartridge to the outlet, said cover member further having an inflexible filter surface formed thereon which is abuttingly engageable with the distal portions of said longitudinal wall members and comprising a plurality of transverse groove formed thereon to communicate said interdigitated passageways when said cover member is in a closed position, said cover member and body being insertable in a closed position into said housing through said outlet for filtering foreign particles suspended in liquid flowing from said inlet to said outlet, said body and cover member being further removable from said housing, whereby said cover member can be pivoted to said open position whereby said filter surface and flow passages may be flushed clean.

References Cited

UNITED STATES PATENTS

| | | | |
|---|---|---|---|
| 2,936,604 | 5/1960 | Glendening | 210—167 X |
| 3,219,192 | 11/1965 | Trembath et al. | 210—167 X |
| 3,240,345 | 3/1966 | Butler et al. | 210—435 |
| 3,282,427 | 11/1966 | Mandarino et al. | 210—416 X |

REUBEN FRIEDMAN, *Primary Examiner.*

C. DITLOW, *Assistant Examiner.*